United States Patent
Tyler et al.

(10) Patent No.: US 10,857,726 B2
(45) Date of Patent: Dec. 8, 2020

(54) ADDITIVE MANUFACTURING SYSTEM IMPLEMENTING ANCHOR CURING

(71) Applicant: CC3D LLC, Coeur d'Alene, ID (US)

(72) Inventors: Kenneth Lyle Tyler, Coeur d'Alene, ID (US); Ryan C Stockett, Lebanon, NH (US)

(73) Assignee: Continuous Composites Inc., Coeur d'Alene, ID (US)

( * ) Notice: Subject to any disclaimer, the term of this patent is extended or adjusted under 35 U.S.C. 154(b) by 325 days.

(21) Appl. No.: 15/846,372

(22) Filed: Dec. 19, 2017

(65) Prior Publication Data

US 2018/0207862 A1    Jul. 26, 2018

Related U.S. Application Data

(60) Provisional application No. 62/449,899, filed on Jan. 24, 2017.

(51) Int. Cl.
*B29C 64/165* (2017.01)
*B29C 64/135* (2017.01)
(Continued)

(52) U.S. Cl.
CPC ............ *B29C 64/165* (2017.08); *B29C 48/08* (2019.02); *B29C 48/30* (2019.02); *B29C 48/305* (2019.02);
(Continued)

(58) Field of Classification Search
None
See application file for complete search history.

(56) References Cited

U.S. PATENT DOCUMENTS 3,286,305 A    11/1966 Seckel
3,809,514 A    5/1974 Nunez
(Continued)

FOREIGN PATENT DOCUMENTS

DE         4102257 A1    7/1992
DE    102015002967 A1   10/2016
(Continued)

OTHER PUBLICATIONS

A. Di. Pietro & Paul Compston, Resin Hardness and Interlaminar Shear Strength of a Glass-Fibre/Vinylester Composite Cured with High Intensity Ultraviolet (UV) Light, Journal of Materials Science, vol. 44, pp. 4188-4190 (Apr. 2009).
(Continued)

*Primary Examiner* — Seyed Masoud Malekzadeh
*Assistant Examiner* — Manley L Cummins, IV
(74) *Attorney, Agent, or Firm* — Ryan C. Stockett

(57) ABSTRACT

A system for additively manufacturing a composite structure is disclosed. The system may include a print head configured to discharge a matrix-coated reinforcement, and a support configured to move the print head in multiple dimensions during discharging of the matrix-coated reinforcement. The system may further include at least one cure enhancer located offboard the print head, and a controller in communication with the support and the at least one cure enhancer. The controller may be configured to selectively activate the at least one cure enhancer to expose the matrix-coated reinforcement to a cure energy during discharging of the matrix-coated reinforcement.

15 Claims, 1 Drawing Sheet

(51) Int. Cl.

| | |
|---|---|
| B29C 64/209 | (2017.01) |
| B33Y 10/00 | (2015.01) |
| B33Y 30/00 | (2015.01) |
| B29C 64/371 | (2017.01) |
| B29C 48/08 | (2019.01) |
| B29C 48/30 | (2019.01) |
| B29C 48/35 | (2019.01) |
| B29C 48/305 | (2019.01) |
| B29C 64/245 | (2017.01) |
| B29C 64/124 | (2017.01) |
| B29C 70/24 | (2006.01) |
| B29C 70/38 | (2006.01) |
| B29C 64/129 | (2017.01) |
| B29C 70/68 | (2006.01) |
| B33Y 50/02 | (2015.01) |
| B33Y 70/00 | (2020.01) |
| B29C 64/214 | (2017.01) |
| B29C 64/264 | (2017.01) |
| B29C 64/118 | (2017.01) |
| B29C 64/393 | (2017.01) |
| B29C 64/106 | (2017.01) |
| B29C 64/336 | (2017.01) |
| B29C 70/06 | (2006.01) |
| B29C 64/218 | (2017.01) |
| B29K 105/10 | (2006.01) |
| B29K 105/00 | (2006.01) |
| B22F 7/06 | (2006.01) |
| B22F 3/00 | (2006.01) |
| B33Y 80/00 | (2015.01) |
| B22F 3/10 | (2006.01) |
| B22F 3/11 | (2006.01) |
| B29C 64/227 | (2017.01) |
| B29K 105/08 | (2006.01) |
| B33Y 40/00 | (2020.01) |
| B29B 15/12 | (2006.01) |

(52) U.S. Cl.
CPC ............ *B29C 48/35* (2019.02); *B29C 64/106* (2017.08); *B29C 64/118* (2017.08); *B29C 64/124* (2017.08); *B29C 64/129* (2017.08); *B29C 64/135* (2017.08); *B29C 64/209* (2017.08); *B29C 64/214* (2017.08); *B29C 64/218* (2017.08); *B29C 64/245* (2017.08); *B29C 64/264* (2017.08); *B29C 64/336* (2017.08); *B29C 64/371* (2017.08); *B29C 64/393* (2017.08); *B29C 70/06* (2013.01); *B29C 70/24* (2013.01); *B29C 70/382* (2013.01); *B29C 70/384* (2013.01); *B29C 70/683* (2013.01); *B33Y 10/00* (2014.12); *B33Y 30/00* (2014.12); *B33Y 50/02* (2014.12); *B33Y 70/00* (2014.12); *B22F 3/008* (2013.01); *B22F 3/1035* (2013.01); *B22F 3/1118* (2013.01); *B22F 7/06* (2013.01); *B22F 2999/00* (2013.01); *B29B 15/122* (2013.01); *B29C 64/227* (2017.08); *B29K 2105/0058* (2013.01); *B29K 2105/08* (2013.01); *B29K 2105/101* (2013.01); *B33Y 40/00* (2014.12); *B33Y 80/00* (2014.12)

(56) References Cited

U.S. PATENT DOCUMENTS

| | | |
|---|---|---|
| 3,984,271 A | 10/1976 | Gilbu |
| 3,993,726 A | 11/1976 | Moyer |
| 4,643,940 A | 2/1987 | Shaw et al. |
| 4,671,761 A | 6/1987 | Adrian et al. |
| 4,822,548 A | 4/1989 | Hempel |
| 4,851,065 A | 7/1989 | Curtz |
| 5,002,712 A | 3/1991 | Goldmann et al. |
| 5,037,691 A | 8/1991 | Medney et al. |
| 5,134,569 A * | 7/1992 | Masters ............... B29C 64/106 700/182 |
| 5,204,124 A * | 4/1993 | Secretan ............... B29C 64/124 425/145 |
| 5,296,335 A | 3/1994 | Thomas et al. |
| 5,340,433 A | 8/1994 | Crump |
| 5,534,101 A * | 7/1996 | Keyworth ......... B29D 11/00663 156/244.12 |
| 5,746,967 A | 5/1998 | Hoy et al. |
| 5,866,058 A | 2/1999 | Batchelder et al. |
| 5,936,861 A | 8/1999 | Jang et al. |
| 6,153,034 A | 11/2000 | Lipsker |
| 6,459,069 B1 | 10/2002 | Rabinovich |
| 6,501,554 B1 | 12/2002 | Hackney et al. |
| 6,799,081 B1 | 9/2004 | Hale et al. |
| 6,803,003 B2 | 10/2004 | Rigali et al. |
| 6,934,600 B2 | 8/2005 | Jang et al. |
| 7,039,485 B2 | 5/2006 | Engelbart et al. |
| 7,555,404 B2 | 6/2009 | Brennan et al. |
| 7,795,349 B2 | 9/2010 | Bredt et al. |
| 8,221,669 B2 | 7/2012 | Batchelder et al. |
| 8,962,717 B2 | 2/2015 | Roth et al. |
| 9,126,365 B1 | 9/2015 | Mark et al. |
| 9,126,367 B1 | 9/2015 | Mark et al. |
| 9,149,988 B2 | 10/2015 | Mark et al. |
| 9,156,205 B2 | 10/2015 | Mark et al. |
| 9,186,846 B1 | 11/2015 | Mark et al. |
| 9,186,848 B2 | 11/2015 | Mark et al. |
| 9,327,452 B2 | 5/2016 | Mark et al. |
| 9,327,453 B2 | 5/2016 | Mark et al. |
| 9,370,896 B2 | 6/2016 | Mark |
| 9,381,702 B2 | 7/2016 | Hollander |
| 9,457,521 B2 | 10/2016 | Johnston et al. |
| 9,458,955 B2 | 10/2016 | Hammer et al. |
| 9,527,248 B2 | 12/2016 | Hollander |
| 9,539,762 B2 | 1/2017 | Durand et al. |
| 9,579,851 B2 | 2/2017 | Mark et al. |
| 9,688,028 B2 | 6/2017 | Mark et al. |
| 9,694,544 B2 | 7/2017 | Mark et al. |
| 9,764,378 B2 | 9/2017 | Peters et al. |
| 9,770,876 B2 | 9/2017 | Farmer et al. |
| 9,782,926 B2 | 10/2017 | Witzel et al. |
| 2002/0009935 A1 | 1/2002 | Hsiao et al. |
| 2002/0062909 A1 | 5/2002 | Jang et al. |
| 2002/0113331 A1 | 8/2002 | Zhang et al. |
| 2002/0127345 A1 | 9/2002 | Rheinberger et al. |
| 2002/0165304 A1 | 11/2002 | Mulligan et al. |
| 2003/0044539 A1 | 3/2003 | Oswald |
| 2003/0056870 A1 | 3/2003 | Comb et al. |
| 2003/0160970 A1 | 8/2003 | Basu et al. |
| 2003/0186042 A1 | 10/2003 | Dunlap et al. |
| 2003/0236588 A1 | 12/2003 | Jang et al. |
| 2005/0006803 A1 | 1/2005 | Owens |
| 2005/0061422 A1 | 3/2005 | Martin |
| 2005/0104257 A1 | 5/2005 | Gu et al. |
| 2005/0109451 A1 | 5/2005 | Hauber et al. |
| 2005/0230029 A1 | 10/2005 | Vaidyanathan et al. |
| 2007/0003650 A1 | 1/2007 | Schroeder |
| 2007/0228592 A1 | 10/2007 | Dunn et al. |
| 2008/0176092 A1 | 7/2008 | Owens |
| 2009/0095410 A1 | 4/2009 | Oldani |
| 2011/0032301 A1 | 2/2011 | Fienup et al. |
| 2011/0143108 A1 | 6/2011 | Fruth et al. |
| 2012/0060468 A1 | 3/2012 | Dushku et al. |
| 2012/0159785 A1 | 6/2012 | Pyles et al. |
| 2012/0231225 A1 | 9/2012 | Mikulak et al. |
| 2012/0247655 A1 | 10/2012 | Erb et al. |
| 2013/0164498 A1 | 6/2013 | Langone et al. |
| 2013/0209600 A1 | 8/2013 | Tow |
| 2013/0233471 A1 | 9/2013 | Kappesser et al. |
| 2013/0292039 A1 | 11/2013 | Peters et al. |
| 2013/0337256 A1 | 12/2013 | Farmer et al. |
| 2013/0337265 A1 | 12/2013 | Farmer |
| 2014/0034214 A1 | 2/2014 | Boyer et al. |

(56) References Cited

U.S. PATENT DOCUMENTS

| | | |
|---|---|---|
| 2014/0036455 A1 | 2/2014 | Napadensky |
| 2014/0061974 A1 | 3/2014 | Tyler |
| 2014/0159284 A1 | 6/2014 | Leavitt |
| 2014/0232035 A1 | 8/2014 | Bheda |
| 2014/0268604 A1 | 9/2014 | Wicker et al. |
| 2014/0291886 A1 | 10/2014 | Mark et al. |
| 2015/0136455 A1 | 5/2015 | Fleming |
| 2015/0165691 A1* | 6/2015 | Mark .............. G06F 30/00 700/98 |
| 2015/0217517 A1* | 8/2015 | Karpas ........... B29C 64/106 264/464 |
| 2016/0012935 A1 | 1/2016 | Rothfuss |
| 2016/0031155 A1 | 2/2016 | Tyler |
| 2016/0046082 A1 | 2/2016 | Fuerstenberg |
| 2016/0052208 A1 | 2/2016 | Debora et al. |
| 2016/0067928 A1 | 3/2016 | Mark et al. |
| 2016/0082641 A1 | 3/2016 | Bogucki et al. |
| 2016/0082659 A1 | 3/2016 | Hickman et al. |
| 2016/0107379 A1 | 4/2016 | Mark et al. |
| 2016/0114532 A1 | 4/2016 | Schirtzinger et al. |
| 2016/0136885 A1 | 5/2016 | Nielsen-Cole et al. |
| 2016/0144565 A1 | 5/2016 | Mark et al. |
| 2016/0144566 A1 | 5/2016 | Mark et al. |
| 2016/0192741 A1 | 7/2016 | Mark |
| 2016/0200047 A1 | 7/2016 | Mark et al. |
| 2016/0243762 A1 | 8/2016 | Fleming et al. |
| 2016/0263806 A1 | 9/2016 | Gardiner |
| 2016/0263822 A1 | 9/2016 | Boyd, IV |
| 2016/0263823 A1 | 9/2016 | Espiau et al. |
| 2016/0271876 A1 | 9/2016 | Lower |
| 2016/0297104 A1 | 10/2016 | Guillemette et al. |
| 2016/0311165 A1 | 10/2016 | Mark et al. |
| 2016/0325491 A1 | 11/2016 | Sweeney et al. |
| 2016/0332369 A1 | 11/2016 | Shah et al. |
| 2016/0339633 A1 | 11/2016 | Stolyarov et al. |
| 2016/0346998 A1 | 12/2016 | Mark et al. |
| 2016/0361869 A1 | 12/2016 | Mark et al. |
| 2016/0368213 A1 | 12/2016 | Mark |
| 2016/0368255 A1 | 12/2016 | Witte et al. |
| 2017/0007359 A1 | 1/2017 | Kopelman et al. |
| 2017/0007360 A1 | 1/2017 | Kopelman et al. |
| 2017/0007361 A1 | 1/2017 | Boronkay et al. |
| 2017/0007362 A1 | 1/2017 | Chen et al. |
| 2017/0007363 A1 | 1/2017 | Boronkay |
| 2017/0007365 A1 | 1/2017 | Kopelman et al. |
| 2017/0007366 A1 | 1/2017 | Kopelman et al. |
| 2017/0007367 A1 | 1/2017 | Li et al. |
| 2017/0007368 A1 | 1/2017 | Boronkay |
| 2017/0007386 A1 | 1/2017 | Mason et al. |
| 2017/0008333 A1 | 1/2017 | Mason et al. |
| 2017/0014950 A1 | 1/2017 | Okada |
| 2017/0015059 A1 | 1/2017 | Lewicki |
| 2017/0015060 A1 | 1/2017 | Lewicki et al. |
| 2017/0021565 A1 | 1/2017 | Deaville |
| 2017/0028434 A1 | 2/2017 | Evans et al. |
| 2017/0028588 A1 | 2/2017 | Evans et al. |
| 2017/0028617 A1 | 2/2017 | Evans et al. |
| 2017/0028619 A1 | 2/2017 | Evans et al. |
| 2017/0028620 A1 | 2/2017 | Evans et al. |
| 2017/0028621 A1 | 2/2017 | Evans et al. |
| 2017/0028623 A1 | 2/2017 | Evans et al. |
| 2017/0028624 A1 | 2/2017 | Evans et al. |
| 2017/0028625 A1 | 2/2017 | Evans et al. |
| 2017/0028627 A1 | 2/2017 | Evans et al. |
| 2017/0028628 A1 | 2/2017 | Evans et al. |
| 2017/0028633 A1 | 2/2017 | Evans et al. |
| 2017/0028634 A1 | 2/2017 | Evans et al. |
| 2017/0028635 A1 | 2/2017 | Evans et al. |
| 2017/0028636 A1 | 2/2017 | Evans et al. |
| 2017/0028637 A1 | 2/2017 | Evans et al. |
| 2017/0028638 A1 | 2/2017 | Evans et al. |
| 2017/0028639 A1 | 2/2017 | Evans et al. |
| 2017/0028644 A1 | 2/2017 | Evans et al. |
| 2017/0030207 A1 | 2/2017 | Kittleson |
| 2017/0036403 A1 | 2/2017 | Ruff et al. |
| 2017/0050340 A1 | 2/2017 | Hollander |
| 2017/0057164 A1 | 3/2017 | Hemphill et al. |
| 2017/0057165 A1 | 3/2017 | Waldrop, III et al. |
| 2017/0057167 A1 | 3/2017 | Tooren et al. |
| 2017/0057181 A1 | 3/2017 | Waldrop, III et al. |
| 2017/0064840 A1 | 3/2017 | Espalin et al. |
| 2017/0066187 A1 | 3/2017 | Mark et al. |
| 2017/0087768 A1 | 3/2017 | Bheda |
| 2017/0106565 A1 | 4/2017 | Braley et al. |
| 2017/0120519 A1 | 5/2017 | Mark |
| 2017/0129170 A1 | 5/2017 | Kim et al. |
| 2017/0129171 A1 | 5/2017 | Gardner et al. |
| 2017/0129176 A1 | 5/2017 | Waatti et al. |
| 2017/0129182 A1 | 5/2017 | Sauti et al. |
| 2017/0129186 A1 | 5/2017 | Sauti et al. |
| 2017/0144375 A1 | 5/2017 | Waldrop, III et al. |
| 2017/0151728 A1 | 6/2017 | Kunc et al. |
| 2017/0157828 A1 | 6/2017 | Mandel et al. |
| 2017/0157831 A1 | 6/2017 | Mandel et al. |
| 2017/0157844 A1 | 6/2017 | Mandel et al. |
| 2017/0157851 A1 | 6/2017 | Nardiello et al. |
| 2017/0165908 A1 | 6/2017 | Pattinson et al. |
| 2017/0173868 A1 | 6/2017 | Mark |
| 2017/0182712 A1 | 6/2017 | Scribner et al. |
| 2017/0210074 A1 | 7/2017 | Ueda et al. |
| 2017/0217088 A1 | 8/2017 | Boyd et al. |
| 2017/0232674 A1 | 8/2017 | Mark |
| 2017/0259502 A1 | 9/2017 | Chapiro et al. |
| 2017/0259507 A1 | 9/2017 | Hocker |
| 2017/0266876 A1 | 9/2017 | Hocker |
| 2017/0274585 A1 | 9/2017 | Armijo et al. |
| 2017/0284876 A1 | 10/2017 | Moorlag et al. |
| 2018/0154588 A1* | 6/2018 | Wilenski .............. B33Y 10/00 |

FOREIGN PATENT DOCUMENTS

| | | |
|---|---|---|
| EP | 2447046 A2 | 5/2012 |
| EP | 2589481 B1 | 1/2016 |
| EP | 3219474 A1 | 9/2017 |
| KR | 100995983 B1 | 11/2010 |
| KR | 101172859 B1 | 8/2012 |
| WO | 2013017284 A2 | 2/2013 |
| WO | 2016088042 A1 | 6/2016 |
| WO | 2016088048 A1 | 6/2016 |
| WO | 2016110444 A1 | 7/2016 |
| WO | 2016159259 A1 | 10/2016 |
| WO | 2016196382 A1 | 12/2016 |
| WO | 2017006178 A1 | 1/2017 |
| WO | 2017006324 A1 | 1/2017 |
| WO | 2017051202 A1 | 3/2017 |
| WO | 2017081253 A1 | 5/2017 |
| WO | 2017085649 A1 | 5/2017 |
| WO | 2017087663 A1 | 5/2017 |
| WO | 2017108758 A1 | 6/2017 |
| WO | 2017122941 A1 | 7/2017 |
| WO | 2017122942 A1 | 7/2017 |
| WO | 2017122943 A1 | 7/2017 |
| WO | 2017123726 A1 | 7/2017 |
| WO | 2017124085 A1 | 7/2017 |
| WO | 2017126476 A1 | 7/2017 |
| WO | 2017126477 A1 | 7/2017 |
| WO | 2017137851 A2 | 8/2017 |
| WO | 2017142867 A1 | 8/2017 |
| WO | 2017150186 A1 | 9/2017 |

OTHER PUBLICATIONS

A. Endruweit, M. S. Johnson, & A. C. Long, Curing of Composite Components by Ultraviolet Radiation: A Review, Polymer Composites, pp. 119-128 (Apr, 2006).

C. Fragassa, & G. Minak, Standard Characterization for Mechanical Properties of Photopolymer Resins for Rapid Prototyping, 1st Symposium on Multidisciplinary Studies of Design in Mechanical Engineering, Bertinoro, Italy (Jun. 25-28, 2008).

Hyouk Ryeol CHOI and Se-gon ROH, In-pipe Robot with Active Steering Capability for Moving Inside of Pipelines, Bioinspiration and Robotics: Walking and Climbing Robots, Sep. 2007, p. 544, I-Tech, Vienna, Austria.

(56) References Cited

OTHER PUBLICATIONS

Kenneth C. Kennedy II & Robert P. Kusy, UV-Cured Pultrusion Processing of Glass-Reinforced Polymer Composites, Journal of Vinyl and Additive Technology, vol. 1, Issue 3, pp. 182-186 (Sep. 1995).
M. Martin-Gallego et al., Epoxy-Graphene UV-Cured Nanocomposites, Polymer, vol. 52, Issue 21, pp. 4664-4669 (Sep. 2011).
P. Compston, J, Schiemer, & A. Cvetanovska, Mechanical Properties and Styrene Emission Levels of a UV-Cured Glass-Fibre/ Vinylester Composite, Composite Structures, vol. 86, pp, 22-26 (Mar. 2008).
S Kumar & J.-P. Kruth, Composites by Rapid Prototyping Technology, Materials and Design, (Feb. 2009).
S. L. Fan, F. Y. C. Boey, & M. J. M. Abadie, UV Curing of a Liquid Based Bismaleimide-Containing Polymer System, eXPRESS Polymer Letters, vol. 1, No. 6, pp. 397-405 (2007).
T.M. Llewelly-Jones, Bruce W. Drinkwater, and Richard S. Trask; 3D Printed Components With Ultrasonically Arranged Microscale Structure, Smart Materials and Structures, 2016, pp. 1-6, vol. 25, IOP Publishing Ltd., UK.
Vincent J. Lopata et al., Electron-Beam-Curable Epoxy Resins for the Manufacture of High-Performance Composites, Radiation Physics and Chemistry, vol. 56, pp. 405-415 (1999).
Yugang Duan et al., Effects of Compaction and UV Exposure on Performance of Acrylate/Glass-Fiber Composites Cured Layer by Layer, Journal of Applied Polymer Science, vol. 123, Issue 6, pp. 3799-805 (May 15, 2012).
International Search Report dated Feb. 20, 2018 for PCT/US2017/ 068019 to CC3D LLC Filed Dec. 21, 2017.

* cited by examiner

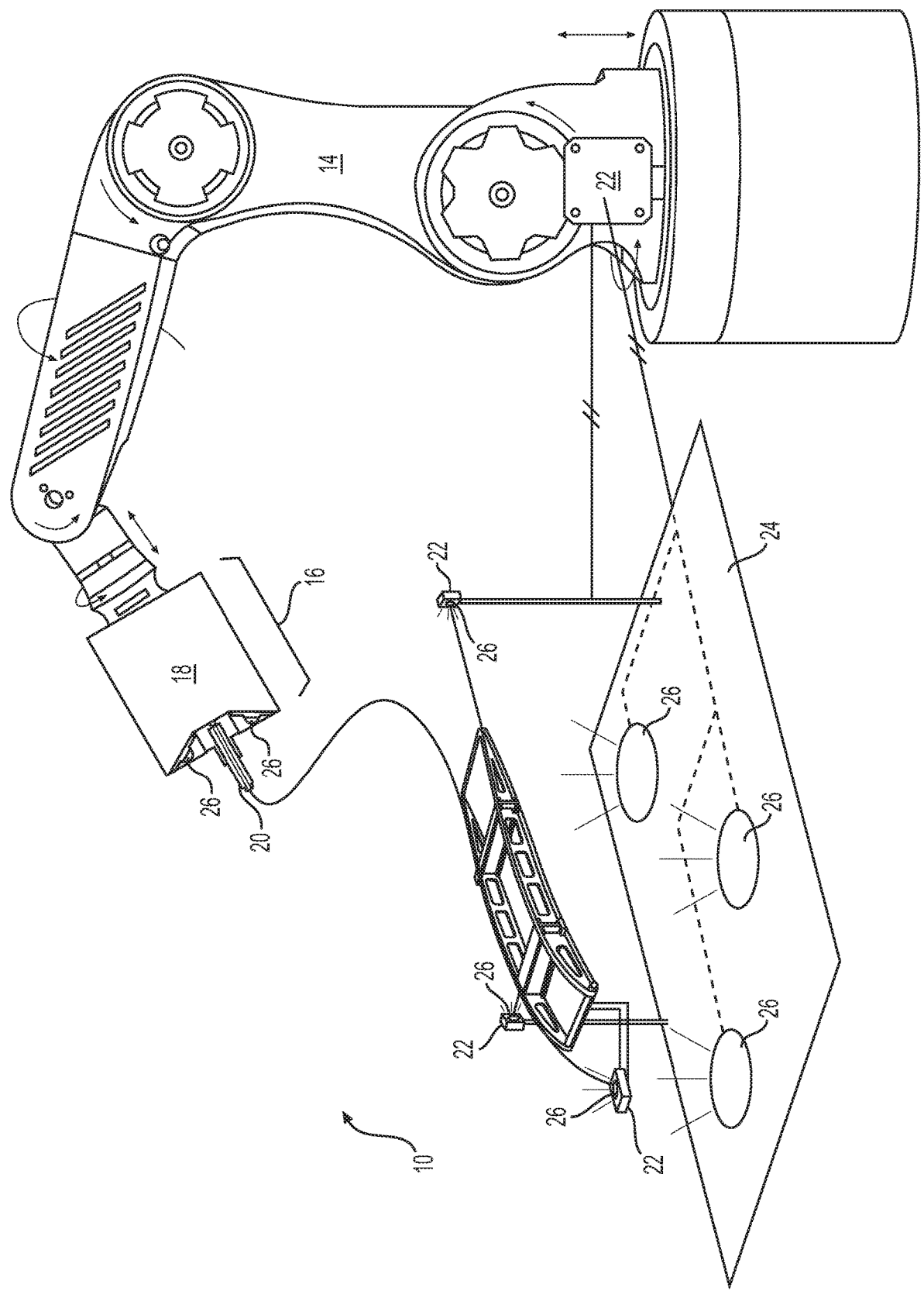

ADDITIVE MANUFACTURING SYSTEM IMPLEMENTING ANCHOR CURING

RELATED APPLICATIONS

This application is based on and claims the benefit of priority from U.S. Provisional Application No. 62/449,899 that was filed on Jan. 24, 2017, the contents of which are expressly incorporated herein by reference.

TECHNICAL FIELD

The present disclosure relates generally to a manufacturing system and, more particularly, to an additive manufacturing system implementing anchor curing.

BACKGROUND

Traditional additive manufacturing is a process of creating three-dimensional parts by depositing overlapping layers of material under the guided control of a computer. A common form of additive manufacturing is known as fused deposition modeling (FDM). Using FDM, a thermoplastic is passed through and liquified within a heated print head. The print head is moved in a predefined trajectory (a.k.a., a tool path) as the material discharges from the print head, such that the material is laid down in a particular pattern and shape of overlapping 2-dimensional layers. The material, after exiting the print head, cools and hardens into a final form. A strength of the final form is primarily due to properties of the particular thermoplastic supplied to the print head and a 3-dimensional shape formed by the stack of 2-dimensional layers.

A recently developed improvement over traditional FDM manufacturing involves the use of continuous fibers embedded within material discharging from the print head (a.k.a., Continuous Fiber 3D Printing—CF3D™). In particular, a matrix is supplied to the print head and discharged (e.g., extruded and/or pultruded) along with one or more continuous fibers also passing through the same head at the same time. The matrix can be a traditional thermoplastic, a powdered metal, a liquid matrix (e.g., a UV curable and/or two-part resin), or a combination of any of these and other known matrixes. Upon exiting the print head, a cure enhancer (e.g., a UV light, an ultrasonic emitter, a heat source, a catalyst supply, etc.) is activated to initiate and/or complete curing of the matrix. This curing occurs almost immediately, allowing for unsupported structures to be fabricated in free space. And when fibers, particularly continuous fibers, are embedded within the structure, a strength of the structure may be multiplied beyond the matrix-dependent strength. An example of this technology is disclosed in U.S. Pat. No. 9,511,543 that issued to Tyler on Dec. 6, 2016 ("the '543 patent").

In some applications, the cure enhancers described above are mounted directly to the print head. In these applications, when discharging relatively opaque fibers, such as carbon fibers, high-density fibers, high-concentrations of fibers, large-diameter fibers, etc., light from the cure enhancers can be blocked by the fibers during an anchoring procedure occurring at a start of a fabrication event. This can lead to the need for manual intervention and/or result in a delayed fabrication start and weak anchoring.

The disclosed system is directed to addressing one or more of the problems set forth above and/or other problems of the prior art.

SUMMARY

In one aspect, the present disclosure is directed to a system for additively manufacturing a composite structure. The system may include a print head configured to discharge a matrix-coated reinforcement, and a support configured to move the print head in multiple dimensions during discharging of the matrix-coated reinforcement. The system may further include at least one cure enhancer located offboard the print head, and a controller in communication with the support and the at least one cure enhancer. The controller may be configured to selectively activate the at least one cure enhancer to expose the matrix-coated reinforcement to a cure energy during discharging of the matrix-coated reinforcement.

In another aspect, the present disclosure is directed to another system for additively manufacturing a composite structure. This system may include a print head configured to discharge a matrix-coated reinforcement, and at least one onboard cure enhancer operatively mounted to the print head. The system may further include a support configured to move the print head in multiple dimensions during discharging of the matrix-coated reinforcement, and at least one offboard cure enhancer located offboard the print head. The system may also include a controller in communication with the support, the at least one onboard cure enhancer, and the at least one offboard cure enhancer. The controller may be configured to selectively activate the at least one onboard cure enhancer and the at least one offboard cure enhancer to expose the matrix-coated reinforcement to a cure energy during discharging of the matrix-coated reinforcement based on a proximity of the print head.

In yet another aspect, the present disclosure is directed to a method of additively manufacturing a composite structure. The method may include discharging from a print head a matrix-coated reinforcement, and moving the print head in multiple dimensions during discharging of the matrix-coated reinforcement. The method may further include selectively exposing the matrix-coated reinforcement to a cure energy from offboard the print head during discharging of the matrix-coated reinforcement.

BRIEF DESCRIPTION OF THE DRAWINGS

FIG. 1 is a diagrammatic illustration of an exemplary disclosed manufacturing system.

DETAILED DESCRIPTION

FIG. 1 illustrates an exemplary system 10, which may be used to continuously manufacture a composite structure 12 having any desired cross-sectional shape (e.g., circular, polygonal, etc.). System 10 may include at least a support 14 and a head 16. Head 16 may have a body 18 that is coupled to and moved by support 14, and a nozzle 20 located at an opposing discharge end of body 18. In the disclosed embodiment of FIG. 1, support 14 is a robotic arm capable of moving head 16 in multiple directions during fabrication of structure 12, such that a resulting longitudinal axis of structure 12 is three-dimensional. It is contemplated, however, that support 14 could alternatively be an overhead gantry or a hybrid gantry/arm also capable of moving head 16 in multiple directions during fabrication of structure 12. Although support 14 is shown as being capable of 6-axis movements, it is contemplated that any other type of support 14 capable of moving head 16 in the same or in a different manner could also be utilized, if desired. In some embodiments, a drive may mechanically couple head 16 to support 14, and may include components that cooperate to move and/or supply power or materials to head 16.

Body 18 may be configured to receive or otherwise contain a matrix. The matrix may include any type of material (e.g., a liquid resin, such as a zero-volatile organic compound resin; a powdered metal; etc.) that is curable. Exemplary resins include thermosets, single- or multi-part epoxy resins, polyester resins, cationic epoxies, acrylated epoxies, urethanes, esters, thermoplastics, photopolymers, polyepoxides, thiols, alkenes, thiol-enes, and more. In one embodiment, the matrix inside body 18 is pressurized, for example by an external device (e.g., an extruder or another type of pump—not shown) that is fluidly connected to head 16 via a corresponding conduit (not shown). In another embodiment, however, the pressure is generated completely inside of body 18 by a similar type of device. In yet other embodiments, the matrix is gravity-fed through and/or mixed within body 18. In some instances, the matrix may need to be kept cool and/or dark inside body 18 to inhibit premature curing; while in other instances, the matrix may need to be kept warm for the same reason. In either situation, body 18 may be specially configured (e.g., insulated, chilled, and/or warmed) to provide for these needs.

The matrix may be used to coat, encase, or otherwise surround any number of continuous reinforcements (e.g., separate fibers, tows, rovings, and/or sheets of material) and, together with the reinforcements, make up at least a portion (e.g., a wall) of composite structure 12. The reinforcements may be stored within (e.g., on separate internal spools—not shown) or otherwise passed through body 18 (e.g., fed from external spools—not shown). When multiple reinforcements are simultaneously used, the reinforcements may be of the same type and have the same diameter and cross-sectional shape (e.g., circular, square, flat, etc.), or of a different type with different diameters and/or cross-sectional shapes. The reinforcements may include, for example, carbon fibers, vegetable fibers, wood fibers, mineral fibers, glass fibers, metallic wires, optical tubes, etc. It should be noted that the term "reinforcement" is meant to encompass both structural and non-structural types of continuous materials that can be at least partially encased in the matrix discharging from nozzle 20.

The reinforcements may be exposed to (e.g., at least partially coated with) the matrix while the reinforcements are passing through body 18. The matrix, dry reinforcements, and/or reinforcements that are already exposed to the matrix (a.k.a., wetted reinforcements) may be transported into body 18 in any manner apparent to one skilled in the art.

The matrix and reinforcement may be discharged from nozzle 20 as a track of composite material via at least two different modes of operation. In a first mode of operation, the matrix and reinforcement are extruded (e.g., pushed under pressure and/or mechanical force) from nozzle 20, as head 16 is moved by support 14 to create the 3-dimensional shape of structure 12. In a second mode of operation, at least the reinforcement is pulled from nozzle 20, such that a tensile stress is created in the reinforcement during discharge. In this mode of operation, the matrix may cling to the reinforcement and thereby also be pulled from nozzle 20 along with the reinforcement, and/or the matrix may be discharged from nozzle 20 under pressure along with the pulled reinforcement. In the second mode of operation, where the composite material is being pulled from nozzle 20, a residual tension in the reinforcement may increase a strength of structure 12, while also allowing for a greater length of unsupported material to have a straighter trajectory (i.e., the tension may act against the force of gravity to provide free-standing support for structure 12).

The reinforcement may be pulled from nozzle 20 as a result of head 16 moving away from an anchor point 22. In particular, at the start of structure-formation, a length of matrix-impregnated reinforcement may be pulled and/or pushed from nozzle 20, deposited onto anchor point 22, and cured, such that the discharged material adheres to anchor point 22. Thereafter, head 16 may be moved away from anchor point 22, and the relative movement may cause the reinforcement to be pulled from nozzle 20. It should be noted that the movement of reinforcement through body 18 could be assisted (e.g., via one or more internal and/or external feed mechanisms—not shown), if desired. However, the discharge rate of reinforcement from nozzle 20 may primarily be the result of relative movement between head 16 and anchor point 22, such that tension is created and maintained within the reinforcement. It is contemplated that anchor point 22 could be moved away from head 16 instead of or in addition to head 16 being moved away from anchor point 22. Anchor points 22 may extend from a build chamber (e.g., from a print bed or wall) 24 and/or from structure 12 itself. In fact, build chamber may 24, itself, function as an anchor point 22, if desired.

One or more cure enhancers (e.g., a UV light, an ultrasonic emitter, a laser, a heater, a catalyst dispenser, etc.) 26 may be selectively used to enhance a cure rate and/or quality of the matrix as it is discharged from head 16. Cure enhancer 26 may be controlled to selectively expose internal and/or external surfaces of structure 12 to energy (e.g., UV light, electromagnetic radiation, vibrations, heat, a chemical catalyst, hardener, or initiator, etc.) during the formation of structure 12. The energy may increase a rate of chemical reaction occurring within the matrix, sinter the material, harden the material, or otherwise cause the material to cure as it discharges from head 16.

Any number of cure enhancers 26 may be cooperatively energized to produce a desired cure effect within structure 12. In one embodiment, multiple cure enhancers 26 are mounted proximate (e.g., within, on, and/or trailing from) head 16 (e.g., at a base of body 18, inside of body 18, outside of body 18, or otherwise adjacent nozzle 20) and energized continuously during discharge of material from nozzle 20. In another embodiment, at least one cure enhancer 26 is located offboard head 16 and associated with each (e.g., located on, inside of, adjacent to, etc.) anchor point 22. These offboard cure enhancer(s) may be used only during an initial step of a build process to help ensure proper adhesion to anchor point 22. In yet another embodiment, one or more additional offboard cure enhancers 26 are associated with build chamber 24, in which structure 12 is being fabricated. Specifically, one or more cure enhancers 26 may be mounted on, inside of, or behind a floor, wall, and/or ceiling of build chamber 24. For example, the associated surface of build chamber 24 may be generally transparent, and cure enhancer(s) 24 may be located at a side opposite print head 16, such that cure energy passes through the surface. In this embodiment, cure enhancers 26 may be selectively activated at any time during the build process (e.g., simultaneously and continuously throughout the process, or sequentially and temporarily based on a known or tracked proximity of head 16 during controlled movements by support 14) to help ensure a desired level of cure within structure 12. It is contemplated that any combination of head-mounted, anchor-mounted, and/or chamber-mounted cure enhancers 26 may be used at any time during fabrication of structure 12. Each of these cure enhancers 26 may generate an equal amount of cure energy of the same type and having the same characteristics (e.g., angle, focus, intensity, wavelength, direction, etc.), or different amounts of cure energy of differing types and having different characteristics.

A controller 28 may be provided and communicatively coupled with support 14, head 16, and any number and type of cure enhancers 26. Controller 28 may embody a single processor or multiple processors that include a means for controlling an operation of system 10. Controller 28 may include one or more general- or special-purpose processors or microprocessors. Controller 28 may further include or be associated with a memory for storing data such as, for example, design limits, performance characteristics, operational instructions, matrix characteristics, reinforcement characteristics, characteristics of structure 12, and corresponding parameters of each component of system 10. Various other known circuits may be associated with controller 28, including power supply circuitry, signal-conditioning circuitry, solenoid/motor driver circuitry, communication circuitry, and other appropriate circuitry. Moreover, controller 28 may be capable of communicating with other components of system 10 via wired and/or wireless transmission.

One or more maps may be stored in the memory of controller 28 and used during fabrication of structure 12. Each of these maps may include a collection of data in the form of lookup tables, graphs, and/or equations. In the disclosed embodiment, the maps are used by controller 28 to determine desired characteristics of cure enhancers 26, the associated matrix, and/or the associated reinforcements at different locations within structure 12. The characteristics may include, among others, a type, quantity, and/or configuration of reinforcement and/or matrix to be discharged at a particular location within structure 12, and/or an amount, shape, timing, and/or location of desired curing. Controller 28 may then correlate operation of support 14 (e.g., the location and/or orientation of head 16) and/or the discharge of material from nozzle 20 (a type of material, desired performance of the material, cross-linking requirements of the material, a discharge rate, etc.) with the operation of cure enhancers 26 such that structure 12 is produced in a desired manner.

INDUSTRIAL APPLICABILITY

The disclosed system may be used to continuously manufacture composite structures having any desired cross-sectional shape, length, density, and/or strength. The composite structures may include any number of different reinforcements of the same or different types, diameters, shapes, configurations, and consists, and/or any number of different matrixes. Operation of system 10 will now be described in detail.

At a start of a manufacturing event, information regarding a desired structure 12 may be loaded into system 10 (e.g., into controller 28 that is responsible for regulating operation of support 14, cure enhancer(s) 26, and/or any other associated components). This information may include, among other things, a size (e.g., diameter, wall thickness, length, etc.), a contour (e.g., a trajectory), surface features (e.g., ridge size, location, thickness, length; flange size, location, thickness, length; etc.), connection geometry (e.g., locations and sizes of couplings, tees, splices, etc.), location-specific matrix stipulations, location-specific reinforcement stipulations, desired cure rates, cure locations, cure shapes, cure amounts, etc. It should be noted that this information may alternatively or additionally be loaded into system 10 at different times and/or continuously during the manufacturing event, if desired.

Based on the component information, a specific cure enhancer configuration may be connected to head 16 (e.g., to the discharge end of body 18), to anchor point(s) 22, and/or various surfaces of build chamber 24, and one or more different (e.g., different sizes, shapes, and/or types of) reinforcements and/or matrixes may be selectively installed within system 10 and/or continuously supplied into nozzle 20. The corresponding reinforcements (e.g., prepreg or dry fibers, tows, ribbons, or sheets) may be passed through nozzle 20, and thereafter connected to a pulling machine (not shown) and/or to a mounting fixture (e.g., to anchor point 22). Installation of the matrix may include filling body 18 and/or coupling of an extruder (not shown) to head 16.

Head 16 may be moved by support 14 under the regulation of controller 28 to cause matrix-coated reinforcements to be placed against or on a corresponding anchor point 22. Any combination of cure enhancers 26 (e.g., the offboard cure enhancers 26 mounted to a particular anchor point 22 and/or the onboard cure enhancers 26 of head 16) may then be selectively activated (e.g., turned on by controller 28) to cause hardening of the matrix surrounding the reinforcements, thereby bonding the reinforcements to anchor point 22.

The component information may then be used to control operation of system 10. For example, the reinforcements may be pulled through body 18, submerged within the matrix, and then discharged from nozzle 20. Controller 28 selectively cause support 14 to move head 16 in a desired manner at this time, such that an axis of the resulting structure 12 follows a desired trajectory (e.g., a free-space, unsupported, 3-D trajectory). In addition, cure enhancers 26 associated with head 16 and/or build chamber 24 may be selectively activated by controller 28 during material discharge to initiate, speed up, or complete hardening of the matrix. As controller 28 causes support 14 to move head 16 about build chamber 24 during material discharging, various chamber-mounted cure enhancers 26 (e.g., those cure enhancers 26 closest to head 16 at any given time) may be selectively activated to provide a desired level of cure within the material.

It will be apparent to those skilled in the art that various modifications and variations can be made to the disclosed systems and head. Other embodiments will be apparent to those skilled in the art from consideration of the specification and practice of the disclosed systems and heads. It is intended that the specification and examples be considered as exemplary only, with a true scope being indicated by the following claims and their equivalents.

What is claimed is:

1. A method of additively manufacturing a composite structure, comprising:
   discharging from a print head a matrix-coated reinforcement;
   moving the print head in multiple dimensions during discharging of the matrix-coated reinforcement; and
   exposing the matrix-coated reinforcement to a cure energy during discharging of the matrix-coated reinforcement by activating one or more of a plurality of cure energy sources located offboard the print head, wherein said activation of the one or more plurality of cure energy sources located offboard of the print head is based on a proximity of the print head discharging the matrix-coated reinforcement to a respective one or more of the plurality of cure energy sources.

2. The method of claim 1, wherein:
discharging from the print head the matrix-coated reinforcement includes discharging the matrix-coated reinforcement into a print chamber; and
activating the one or more of the plurality of cure energy sources includes activating the one or more of the plurality of cure energy sources at a surface of the print chamber.

3. The method of claim 1, wherein:
discharging from the print head the matrix-coated reinforcement includes discharging the matrix-coated reinforcement into a print chamber; and
activating the one or more of the plurality of cure energy sources includes directing the cure energy through a surface of the print chamber.

4. The method of claim 1, wherein:
discharging from the print head the matrix-coated reinforcement includes discharging the matrix-coated reinforcement onto an anchor point that extends inward from a print chamber wall, and moving the print head away from the anchor point to cause the matrix-coated reinforcement to be pulled from the print head; and
activating the one or more of the plurality of cure energy sources located offboard the print head includes exposing the matrix-coated reinforcement to cure energy from the anchor point.

5. The method of claim 1, further selectively exposing the matrix-coated reinforcement to a cure energy from onboard the print head.

6. The method of claim 5, wherein selectively exposing the matrix-coated reinforcement to the cure energy from onboard the print head includes selectively activating a cure source having a different energy characteristic from the cure energy to which the matrix-coated reinforcement is exposed to from offboard the print head.

7. A method of additively manufacturing a composite structure, comprising:
discharging from a print head a composite material that hardens when exposed to a cure energy;
moving the print head during discharging; and
activating one or more of a plurality of available cure energy sources located off board of the print head, wherein said activation is based on a proximity of the print head, during discharging of the composite material, to the one or more of the plurality of energy cure sources located off board of the printhead.

8. The method of claim 7, wherein activating the one or more of the plurality of available cure energy sources includes activating a stationary source.

9. The method of claim 8, wherein:
discharging from the print head includes discharging into a print chamber; and
activating the one or more of the plurality of available cure energy sources includes selectively exposing the composite material to the cure energy from a surface of the print chamber.

10. The method of claim 8, wherein:
discharging from the print head includes discharging into a print chamber; and
activating the one or more of the plurality of available cure energy sources includes directing light through the surface of the print chamber.

11. The method of claim 8, wherein:
discharging from the print head includes discharging onto an anchor point that extends inward from a print chamber wall, and moving the print head away from the anchor point to cause the composite material to be pulled from the print head; and
activating the one or more of the plurality of available cure energy sources includes selectively exposing the composite material to the cure energy from the anchor point.

12. The method of claim 11, wherein:
discharging from the print head includes discharging into a print chamber; and
activating the one or more of the plurality of available cure energy sources further includes selectively exposing the composite material to the cure energy from a surface of the print chamber.

13. The method of claim 8, further including selectively exposing the composite material to additional cure energy from onboard the print head.

14. The method of claim 13, wherein selectively exposing the composite material to additional cure energy from onboard the print head includes selectively exposing the composite material to a cure energy having a characteristic different from the cure energy to which the material is exposed from offboard the print head.

15. The method of claim 14, wherein at least one of the cure energy and the additional cure energy is light energy.

* * * * *